United States Patent
Venable et al.

(10) Patent No.: US 10,025,378 B2
(45) Date of Patent: Jul. 17, 2018

(54) SELECTING USER INTERFACE ELEMENTS VIA POSITION SIGNAL

(71) Applicant: MICROSOFT TECHNOLOGY LICENSING, LLC, Redmond, WA (US)

(72) Inventors: Morgan Kolya Venable, San Francisco, CA (US); Bernard James Kerr, Sausalito, CA (US); Vaibhav Thukral, Kirkland, WA (US); David Nister, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 138 days.

(21) Appl. No.: 13/926,204

(22) Filed: Jun. 25, 2013

(65) Prior Publication Data

US 2014/0380230 A1 Dec. 25, 2014

(51) Int. Cl.
*G06F 3/01* (2006.01)
*G06F 3/0484* (2013.01)
*G06F 3/048* (2013.01)
*G06F 3/0482* (2013.01)
*G06F 3/0486* (2013.01)

(52) U.S. Cl.
CPC ............ *G06F 3/013* (2013.01); *G06F 3/0482* (2013.01); *G06F 3/0486* (2013.01)

(58) Field of Classification Search
None
See application file for complete search history.

(56) References Cited

U.S. PATENT DOCUMENTS

| 5,583,795 A | 12/1996 | Smyth |
| 6,102,870 A | 8/2000 | Edwards |
| 6,535,230 B1 * | 3/2003 | Celik .................... 715/769 |

(Continued)

FOREIGN PATENT DOCUMENTS

| CN | 101405680 A | 4/2009 |
| CN | 102253714 A | 11/2011 |

(Continued)

OTHER PUBLICATIONS

ISA European Patent Office, International Search Report and Written Opinion Issued in Patent Application No. PCT/US2014/043306, dated Sep. 26, 2014, WIPO, 13 Pages.

(Continued)

*Primary Examiner* — Jeffrey A Gaffin
*Assistant Examiner* — Nhat Huy T Nguyen
(74) *Attorney, Agent, or Firm* — Alleman Hall Creasman & Tuttle LLP

(57) ABSTRACT

Embodiments are disclosed herein that relate to selecting user interface elements via a periodically updated position signal. For example, one disclosed embodiment provides a method comprising displaying on a graphical user interface a representation of a user interface element and a representation of an interactive target. The method further comprises receiving an input of coordinates of the periodically updated position signal, and determining a selection of the user interface element if a motion interaction of the periodically updated position signal with the interactive target meets a predetermined motion condition.

14 Claims, 10 Drawing Sheets

(56) References Cited

U.S. PATENT DOCUMENTS

| | | | |
|---|---|---|---|
| 7,561,143 B1* | 7/2009 | Milekic | 345/156 |
| 8,185,845 B2 | 5/2012 | Bjorklund et al. | |
| 8,235,529 B1 | 8/2012 | Raffle et al. | |
| 8,667,562 B2* | 3/2014 | LeBeau | G06F 3/048 726/2 |
| 8,847,903 B2* | 9/2014 | Stokes | G06F 21/31 345/156 |
| 2004/0095390 A1* | 5/2004 | Arning et al. | 345/769 |
| 2009/0241072 A1* | 9/2009 | Chaudhri et al. | 715/863 |
| 2010/0079508 A1* | 4/2010 | Hodge | G06F 3/013 345/697 |
| 2011/0138444 A1* | 6/2011 | Kang | G06F 21/10 726/3 |
| 2011/0141010 A1 | 6/2011 | Sakata et al. | |
| 2011/0170067 A1 | 7/2011 | Sato et al. | |
| 2011/0170742 A1* | 7/2011 | Fukuchi | H04N 5/4403 382/103 |
| 2011/0265022 A1* | 10/2011 | Kamiyama et al. | 715/769 |
| 2012/0019662 A1 | 1/2012 | Maltz | |
| 2012/0154277 A1* | 6/2012 | Bar-Zeev et al. | 345/158 |
| 2012/0223890 A1* | 9/2012 | Borovsky | G06F 3/04883 345/173 |
| 2012/0257035 A1 | 10/2012 | Larsen | |
| 2014/0226131 A1* | 8/2014 | Lopez et al. | 351/210 |
| 2014/0237366 A1* | 8/2014 | Poulos | G06F 3/013 715/728 |
| 2014/0267034 A1* | 9/2014 | Krulce et al. | 345/158 |

FOREIGN PATENT DOCUMENTS

| | | |
|---|---|---|
| CN | 102445989 A | 5/2012 |
| CN | 102640502 A | 8/2012 |
| JP | 2009521753 A | 6/2009 |
| JP | 2011209965 A | 10/2011 |
| JP | 2012063899 A | 3/2012 |
| TW | 200401255 A | 1/2004 |
| WO | 2012028773 A1 | 3/2012 |

OTHER PUBLICATIONS

Tsang, et al., "eSeeTrack—Visualizing Sequential Fixation Patterns", Retrieved at: <<http://webhome.cs.uvic.ca/~mtory/publications/infovis10_tsang.pdf>>, In Journal of IEEE Transactions on Visualization and Computer Graphics, vol. 16, Issue 6, Nov. 2010, pp. 10.

Tien, et al., "Improving Hands-Free Menu Selection using Eyegaze Glances and Fixations", Retrieved at: <<http://www.cs.sfu.ca/~stella/papers/2008/etra.pdf>>, In Proceedings of the Symposium on Eye Tracking Research & Applications, Mar. 26, 2008, pp. 4.

Schutz, et al., "Eye Movements and Perception: A Selective Review", Retrieved at: <<http://www.journalofvision.org/content/11/5/9.full.pdf>>, In the Journal of Vision, vol. 11, Issue 5, Sep. 14, 2011, pp. 30.

IPEA European Patent Office, Second Written Opinion Issued in PCT Application No. PCT/US2014/043306, dated Mar. 9, 2015, WIPO, 5 Pages.

IPEA European Patent Office, International Preliminary Report on Patentability Issued in Application No. PCT/US2014/043306, dated Aug. 17, 2015, WIPO, 8 Pages.

"Office Action Issued in Taiwan Patent Application No. 103118107", dated Aug. 28, 2017, 10 Pages.

"First Office Action and Search Report Issued in Chinese Patent Application No. 201480036632.1", dated Dec. 18, 2017, 11 Pages.

"Office Action Issued in Japanese Patent Application No. 2016-521830", dated Jan. 30, 2018, 5 Pages. (W/o English Translation).

* cited by examiner

__US 10,025,378 B2__

SELECTING USER INTERFACE ELEMENTS VIA POSITION SIGNAL

BACKGROUND

Various types of user input devices may provide position signals to a computing device. For example, eye tracking systems may be used to track a location at which a user's gaze intersects a displayed user interface. Various mechanisms may be used to track eye motions. For example, some eye tracking systems may include one or more light sources configured to direct light (such as infrared light) toward a user's eye, and one or more image sensors configured to capture images of the user's eye. Images of the eye acquired while the light sources are emitting light may be used to detect the location of the user's pupil and of corneal (or other) reflections arising from the light sources. This information may then be used to determine a position of the user's eye. Information regarding the user's eye position then may be used in combination with information regarding a relative location of the user's eye compared to the user interface to determine a location at which the user's gaze intersects the user interface, and thus to determine the position signal.

SUMMARY

Embodiments are disclosed herein that relate to selecting user interface elements via a periodically updated position signal. For example, one disclosed embodiment provides a method comprising displaying on a graphical user interface a representation of a user interface element and a representation of an interactive target. The method further comprises receiving an input of coordinates of the periodically updated position signal, and determining a selection of the user interface element if a motion interaction of the periodically updated position signal with the interactive target meets a predetermined motion condition.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, eye tracking may be used to provide input to a computing device. However, determining an intent of a user to select a graphical user interface element via an eye tracking system may pose challenges. For example, in the case of a user input device such as computer mouse, touch pad, or track ball, a user may manifest an intent to select a user interface object by moving a cursor over a user interface element, and then pushing a button or the like on the user input device to select the element. Likewise, in the case of a touch-sensitive display, a user may select a user interface item by selectively touching the display at an area that represents the user interface item.

In each of these examples, the user's intent can clearly be inferred by a user input (e.g. a mouse button press or screen touch) made via activation of a mechanism (e.g. mouse button or touch screen) that allows the intent to be inferred with some certainty. However, in the case of an eye tracking system configured to provide a position signal to a computing device, it may be difficult to infer a user's intent to select a user interface element with any certainty in the absence of another type of input (e.g. a voice command, body/head gesture, etc.) to trigger selection of a user interface object at which a user is currently gazing.

One potential method of inferring a user's intent to select a user interface element may be to infer such an intent if a user's gaze is determined to dwell on a user interface element for a threshold duration of time. However, dwell-based selection mechanisms may feel slow or otherwise awkward to users.

Accordingly, embodiments are disclosed herein that relate to selecting a user interface element via interaction between a periodically updated position signal and an interactive target associated with the user interface element. The term "periodically updated position signal" refers to a user input mechanism in which a position signal relative to a displayed user interface is provided and regularly updated without any user input used to trigger the regular updating. Selection of a user interface item via a periodically updated position signal is distinguished from ordinary selection of an item via a computer mouse or track pad, which may provide a position signal at a regular frequency, but which utilizes a button press or other signal to select a user interface item. While described herein in the context of an eye tracking system for a near-eye display system, it will be understood that the disclosed embodiments may be utilized with any other suitable periodically updated position signal, including but not limited to body gesture signals derived from image data and/or motion sensor data.

Figure 1A:
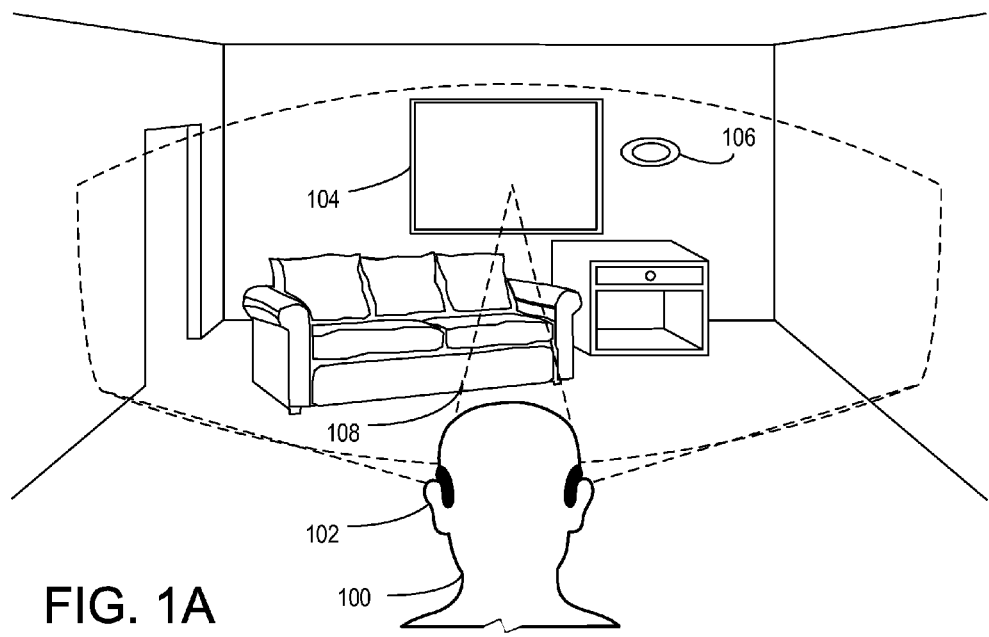
FIGS. 1A-1C depicts an example interaction of a user with a graphical user interface via a periodically updated position signal.
Figure 1B:
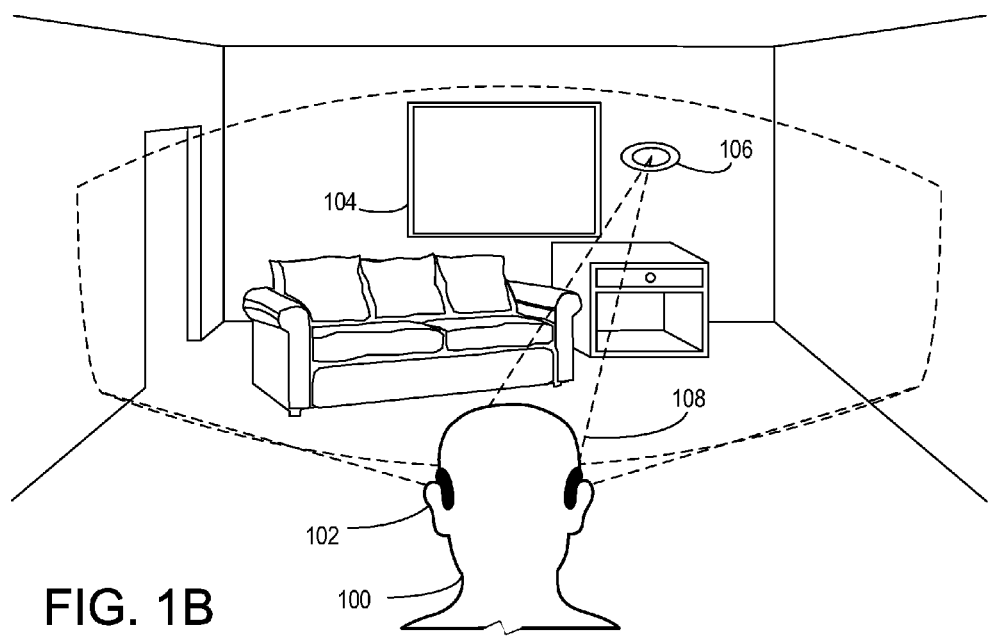
Figure 1C:
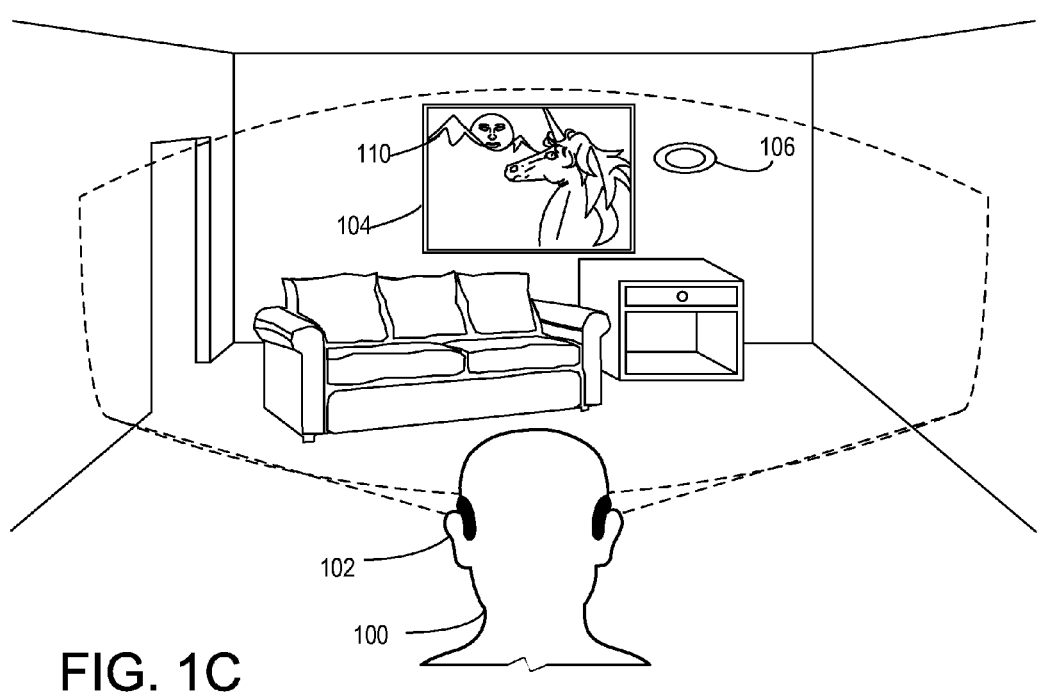

FIGS. 1A-1C show an example embodiment of a user interaction with a graphical user interface via a periodically updated position signal. More specifically, FIGS. 1A-1C depict a user 100 of a near-eye display device in the form of a head-mounted display 102 that is configured to display augmented reality images. These figures also show the user 100 interacting with a graphical user interface element in the form of a virtual television object 104 via an eye tracking system integrated with the near-eye display device, wherein the eye tracking system provides a periodically updated position signal. It will be understood that this embodiment is presented for example and not intended to be limiting, and that any suitable computing device may receive input from any suitable input device configured to provide a periodically updated position signal.

When the user 100 gazes at the virtual television object 104, it may be difficult to determine whether the user wishes to select to play video content via the virtual television object 104, or whether the user is merely examining the virtual television object 104 more closely. Thus, FIG. 1A also depicts a user interface element in the form of an interactive target 106 that is associated with the virtual television object 104 As shown in FIG. 1B, the user 100 may express an intent to activate the virtual television object 104 by moving a location of gaze 108 from the interactive television object 104 to the interactive target 106. Upon detecting that a motion interaction of the periodically updated position signal with the interactive target meets a predetermined motion condition (e.g. moving from the virtual television object to the interactive target, with or without a dwell duration at either location), the virtual television object 104 may be triggered to play video content 110 to the user 100, as shown in FIG. 1C.

The use of an interactive target that is displayed separately from a corresponding selectable user interface element may allow a user's intent to interact with the user interface element to be determined more quickly, and also may provide a more natural user experience, than the use of dwell-based position signal inputs to select user interface elements. For example, a gaze dwell of suitable duration to express a user's intent to select a graphical user interface element may feel unnaturally long and slow to a user. In contrast, interactive targets as disclosed herein may allow the use of more natural eye motions to be used to express this intent. Various examples of interactive targets are described in more detail below.

Figure 2:
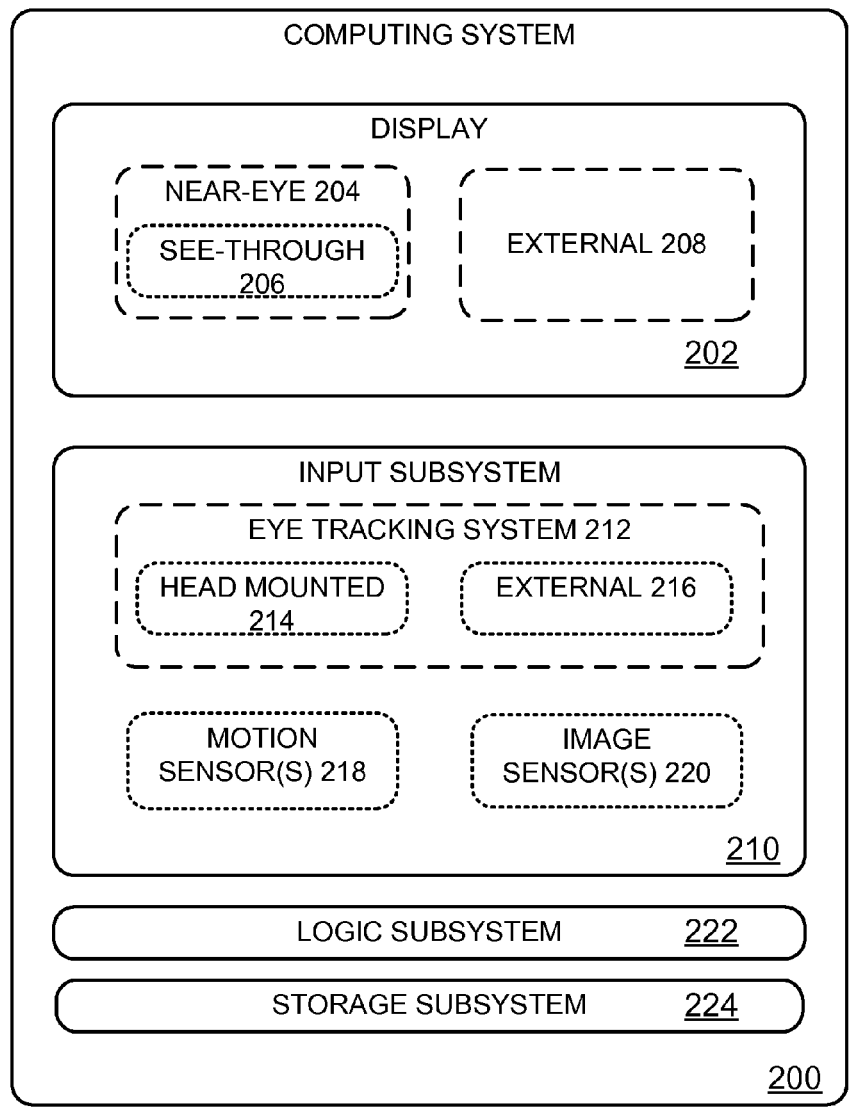
FIG. 2 shows a block diagram of an example embodiment of a computing system configured to receive a selection of a graphical user interface element via a periodically updated position signal.

FIG. 2 shows a block diagram of an embodiment of a computing system 200 configured to allow selection of user interface elements via a periodically updated position signal. The computing system 200 may represent the head-mounted display 102 of FIG. 1, and/or any other suitable computing system configured to utilize a periodically updated position signal as an input. The computing system 200 includes a display 202 on which a graphical user interface may be displayed. The display 202 may take any suitable form. For example, in some embodiments, the computing system may include a near-eye display 204. Examples of near-eye display systems may include, but are not limited to head-mounted displays and handheld devices (e.g. smart phones having a near-eye display mode). In such devices, the near eye display may comprise a see-through display 206, or an opaque display. In other embodiments, the display may be external 208 to a computing device, such as in the case of a conventional monitor, television, or the like.

The computing system 200 further comprises an input subsystem 210 configured to receive an input of a periodically updated position signal from a suitable input device. For example in some embodiments the input subsystem 210 may comprise an eye tracking system 212 configured to produce a periodically updated position signal based upon a determined location of a user's gaze on a graphical user interface. In some embodiments, the eye tracking system 212 may be head-mounted 214 (e.g. incorporated into a head-mounted near-eye display system) or otherwise incorporated into a computing device. In other embodiments, the eye tracking system may be external 216 to a computing device, such as in the case of an eye tracking system utilizing one or more cameras external to a conventional monitor or television used to display a graphical user interface. The eye tracking system may utilize any suitable components. For example, in some embodiments, the eye tracking system may utilize one or more light sources configured to create glint reflections from the cornea of an eye, and one or more image sensors configured to acquire an image of the eye.

Further, the input subsystem 210 may include other sources of periodically updated position signals. For example, the input subsystem 210 may include one or more motion sensors 218 (e.g. incorporated into a head-mounted display or other portable device) and/or one or more image sensors 220 (e.g. one or more outward-facing image sensors configured to capture video images of gestures made by a user, as well as inward-facing image sensors for eye tracking). It will be understood that these embodiments of user input devices that provide periodically updated positions signals are presented for the purpose of example, and are not intended to be limiting in any manner.

The computing system 200 also includes a logic subsystem 222, and a storage subsystem 224. The storage subsystem 224 may include stored instructions executable by the logic subsystem 222 to perform various tasks related to presenting a graphical user interface and receiving and processing periodically updated position signals therefore. Example computing devices are described in more detail below.

Figure 3:
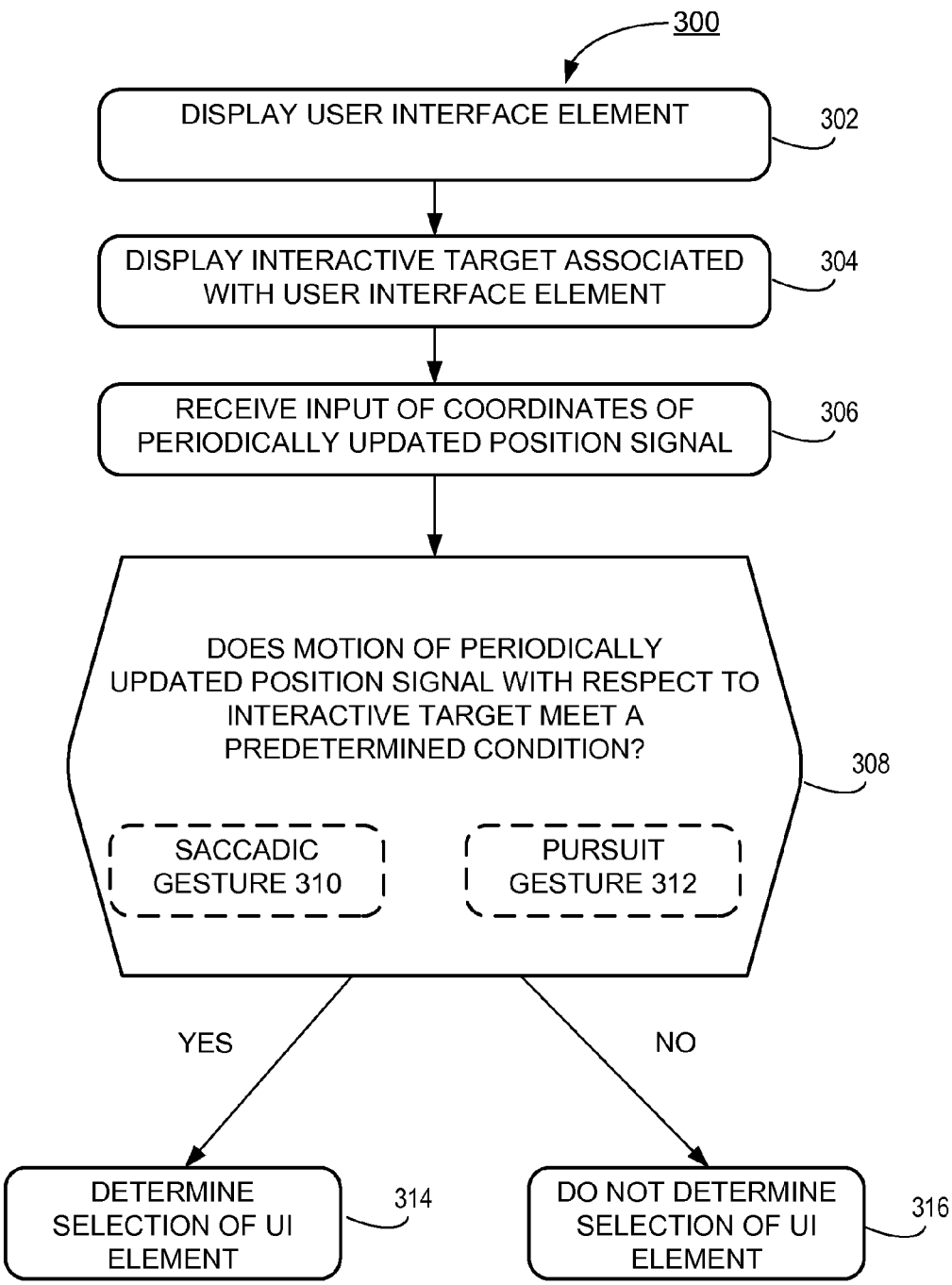
FIG. 3 shows a flow diagram depicting an example embodiment of a method for selecting a user interface element via a periodically updated position signal.

FIG. 3 shows a flow diagram depicting an example embodiment of a method 300 for selecting a graphical user interface element via a periodically updated position signal. Method 300 comprises, at 302, displaying on the graphical user interface a user interface element. The user interface element may take any suitable form and represent any suitable selectable item.

Method 300 further comprises, at 304, displaying on the graphical user interface an interactive target associated with the user interface element. As mentioned above, the interactive target may be utilized to determine a user's intent to select the user interface element via movement of a locus of gaze (or other user input involving controlling a periodically updated position signal) that meets a predetermined motion condition relative to the interactive target. For example, in some embodiments the interactive target may represent a location to which the user's gaze is to be moved after initially gazing at the user interface elements. Further, in some embodiments, the interactive target may represent a location to which the user may move the user interface element via an eye gaze gesture or other suitable type of gesture. Additionally, in some embodiments, multiple interactive targets may be displayed for a corresponding user interface element, such that a user interacts with a plurality of interactive targets to select the user interface element.

An interactive target may be displayed persistently along with the associated user interface element, or may be hidden until the user interacts with the user interface element. Further, where multiple interactive targets are utilized for a user interface element, in some examples each interactive target may remain hidden until a user interacts with an immediately prior interactive target in a sequence. It will be appreciated that these embodiments of interactive targets are described for the purpose of example and are not intended to be limiting in any manner. Other non-limiting examples of interactive targets are described in more detail below.

Continuing, method 300 comprises, at 306, receiving an input of coordinates of the periodically updated position signal. The coordinates may represent, for example, a location at which a user is gazing on a graphical user interface as determined via an eye tracking system, a location at which a user is pointing as determined from a gesture tracking system, a location to which a user has moved a cursor or other representation of the position signal via a gesture, and/or any other suitable information.

Further, changes to the position represented by the coordinates as a function of time may represent input gestures. As described above, movements of a periodically updated position signal that interact with a user interface element and an associated interactive target may be used to determine a user's intent to select the user interface element. As such, method 300 comprises, at 308, determining whether motion of the periodically updated position signal with respect to the interactive target meets a predetermined motion condition. The predetermined motion condition may represent any suitable condition between the motion of the periodically updated position signal and the interactive target. For example, in some embodiments, the predetermined motion condition may correspond to one or more sequential eye gestures (shown at 310) that move between the user interface element and/or one or more interactive targets. FIGS. 1A-1C, discussed above, show one example of a sequential eye gesture. The term "sequential eye gesture" as used herein signifies that the location of gaze moves from a starting location to an ending location on the user interface in one or more sequential segments of movement. Such gestures may allow natural eye movements, such as saccades, to be used to perform the gesture.

A sequential eye gesture may be compared to any suitable predetermined motion condition. For example, in some embodiments, the motion condition may correspond to an expected sequence in which the periodically updated position signal intersects the user interface element and each interactive target. In other embodiments, the motion condition may correspond to how closely a path followed by the motion signal meets a predetermined path. It will be understood that these examples of predetermined motion conditions are presented for the purpose of illustration and not intended to be limiting in any manner.

Figure 4A:
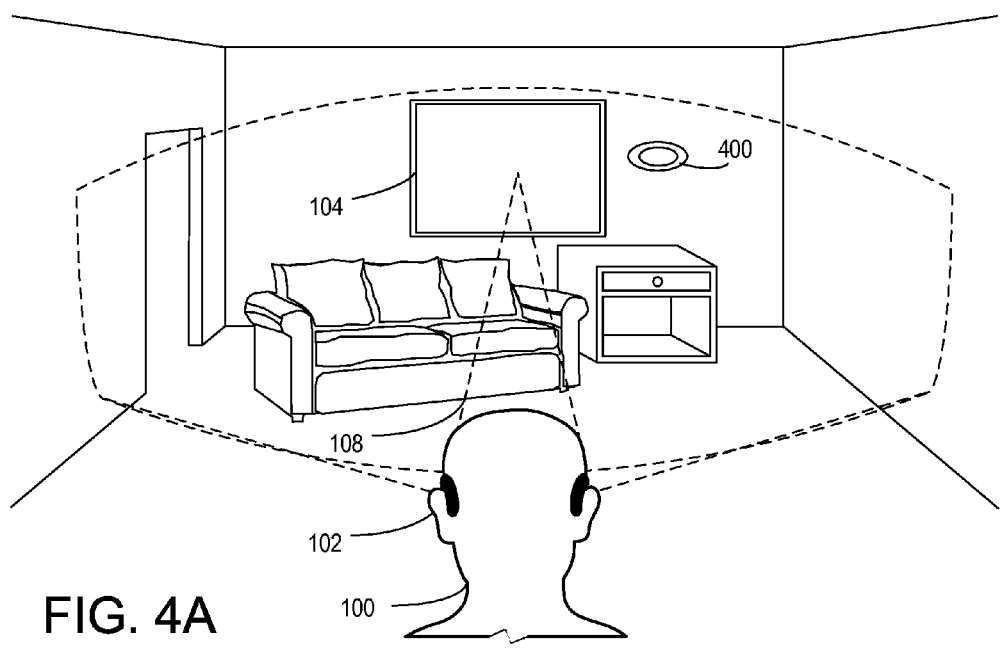
FIGS. 4A-4C show another example interaction of a user with a graphical user interface via a periodically updated position signal.
Figure 4B:
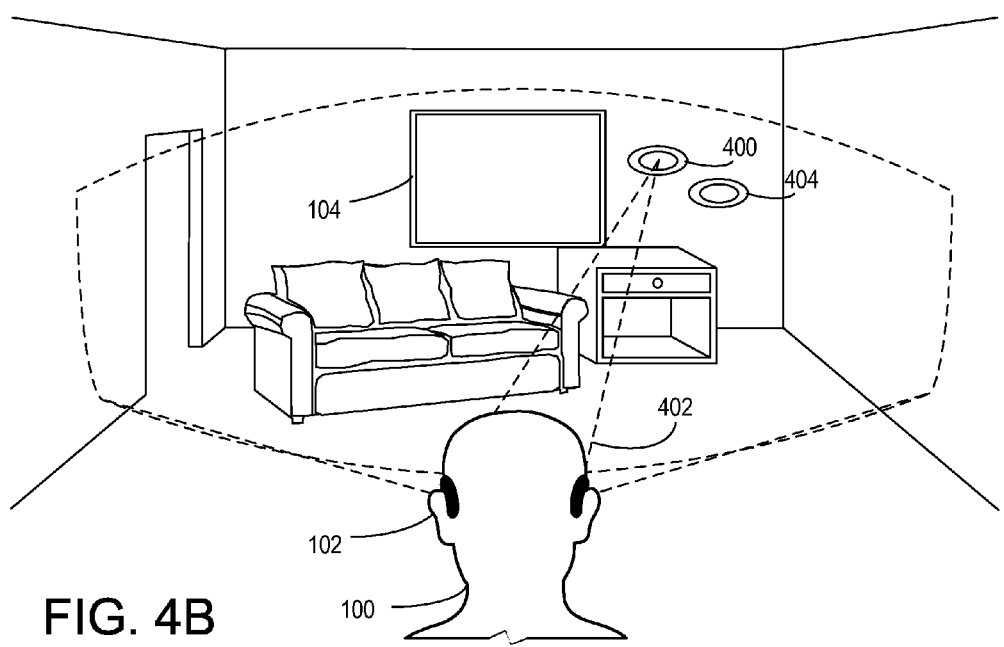
Figure 4C:
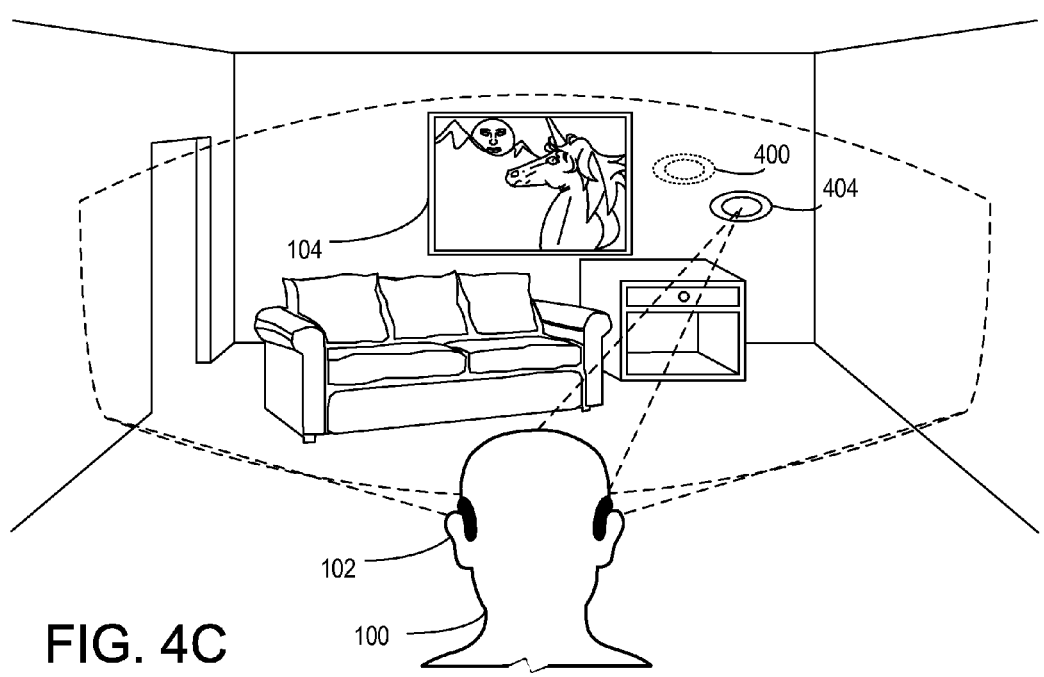

In the example of FIGS. 1A-1C, the sequential eye gesture is performed between the user interface element and a single depicted interactive target. However, as mentioned above, in some embodiments more than one interactive target may be used. FIGS. 4A-4C show an example embodiment in which sequential eye gestures between plural interactive elements are used to determine a user's intent to select an associated user interface element.

First, FIG. 4A shows a location of gaze 108 on the virtual television, and also shows a first interactive target 400 displayed to the right of the virtual television object 104. Next, FIG. 4B shows the location of gaze after performing a first sequential eye gesture 402 in which the gaze is moved from the virtual television to the first interactive target 400. As depicted, the interaction between the periodically updated position signal controlled by the user's gaze and the first interactive target leads to the display of a second interactive target 404. Next referring to FIG. 4C, upon moving the location of gaze to the second interactive target, playback of video content 406 via the virtual television object 104 is selected due to the user's gaze movements meeting a predetermined motion condition (e.g. gazing at the interactive targets in a predetermined order).

Figure 6:
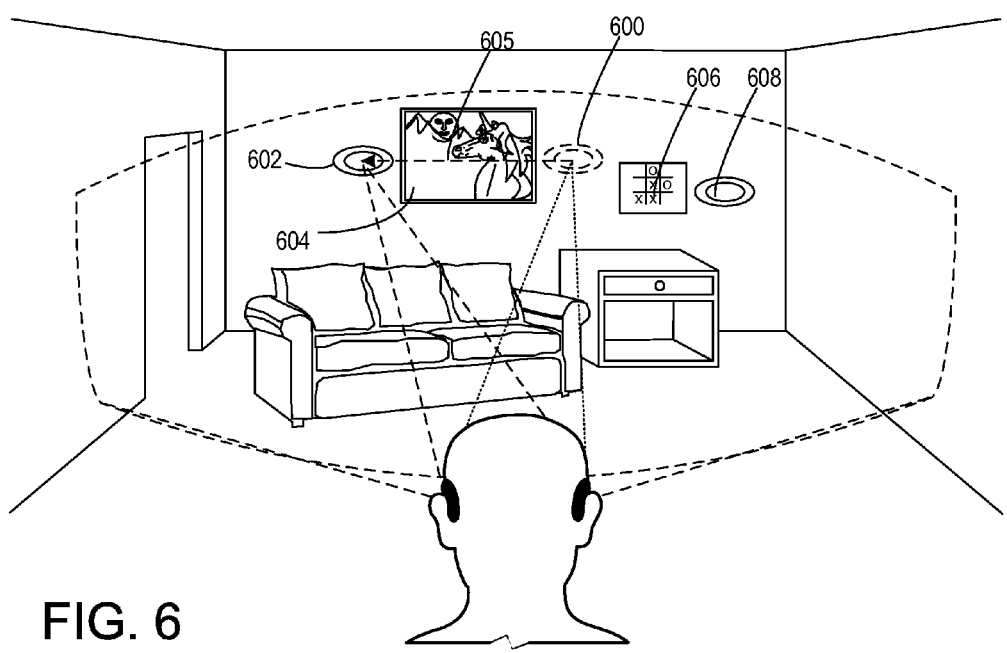
FIG. 6 shows another example interaction of a user with a graphical user interface via a periodically updated position signal.

While the depicted embodiment utilizes two interactive targets, it will be understood that any suitable number of targets may be used. The use of greater number of targets may decrease a likelihood of false positive interactions between the user and the interactive target. Further, while selection of the first interactive target leads to the display of the second interactive target in the depicted embodiment, in other embodiments a plurality of interactive targets for a user interface item may be displayed persistently. Additionally, in some embodiments, multiple interactive targets may be displayed such that they straddle the associated user interface element, such that the users gaze position is averaged approximately over the center of the associated user interface element. Such an arrangement may help to keep the user from inadvertently activating neighboring user interface elements. An example of such a configuration is shown in FIG. 6, where a user is shown gazing at a second interactive target 602 after having previously gazed at a first interactive target 600 located on an opposite side of a virtual television 604. The direction of the eye gaze movement between the first interactive target 600 and the second interactive target 602 is shown by dashed line 605. Further, an additional user interface element is shown as an icon 606 representing a tic-tac-toe game. By placing the interactive targets for the virtual television 604 on opposite sides of the virtual television 604, the eye gaze locations that make up the eye gesture shown by dashed line 605 may average to a location over the virtual television 604, and therefore provide information regarding an intended user interface element. Further, the depicted placement of the interactive targets 600, 602 for the virtual television 604 may help to avoid a user inadvertently gazing at an interactive target 608 associated with icon 606.

In some embodiments, the predetermined motion condition may include short gaze dwells on the one or more interactive targets. Therefore, the specific sequence of motion interactions may include one or more gaze dwells between gaze movements. Such dwells may be imperceptible to the user (i.e., the user does not feel that he is fixating on a particular object for any unnatural duration), but may be long enough to indicate that the user has sufficiently interacted with the interactive target. As one non-limiting example, the dwells may be between 100-150 ms in duration. However, any suitable dwell length may be used for the predetermined motion condition.

In embodiments in which multiple targets are displayed persistently, the targets may employ any suitable system to indicate a correct sequence that will result in activation of the content item. For example, the interactive targets may have numbers (such as 1, 2, 3), words, or animations (such as arrows, sequential highlighting of each target in the appropriate order, sequential revealing of each target, etc.) that indicate the sequence in which a user should interact with the interactive targets to cause activation of the content item. The examples listed above are for the purpose of illustration and are not meant to be limiting in any manner.

Further, where multiple interactive targets are used to select a user interface element, the user's interaction with a later interactive target in a sequence of interactive target interactions may cause an earlier interactive target in the sequence to disappear or change in appearance, as illustrated in FIG. 4C. Such changes in appearance may include, but are not limited to, changes of color, shape, size, transparency, and/or location. It will be appreciated that if a user wishes to not activate the content item associated with the interactive target, the user may disengage from the saccadic gesture before the saccadic gesture is completed (i.e., before the predetermined motion condition is met).

Referring again to FIG. 3, in other embodiments, the predetermined motion condition may correspond to movement of one user interface element into intersection (or other spatial arrangement) with another user interface element via the periodically updated position signal. This may be referred to as a "pursuit" gesture, as indicated at 312, as the user's gaze pursues or drives the user interface element as it moves into intersection with the other user interface element. It will be understood that the term "pursuit gesture" as used herein refers to gestures in which a user's gaze either follows or drives motion of a moveable interactive target toward a destination user interface element.

Figure 5A:
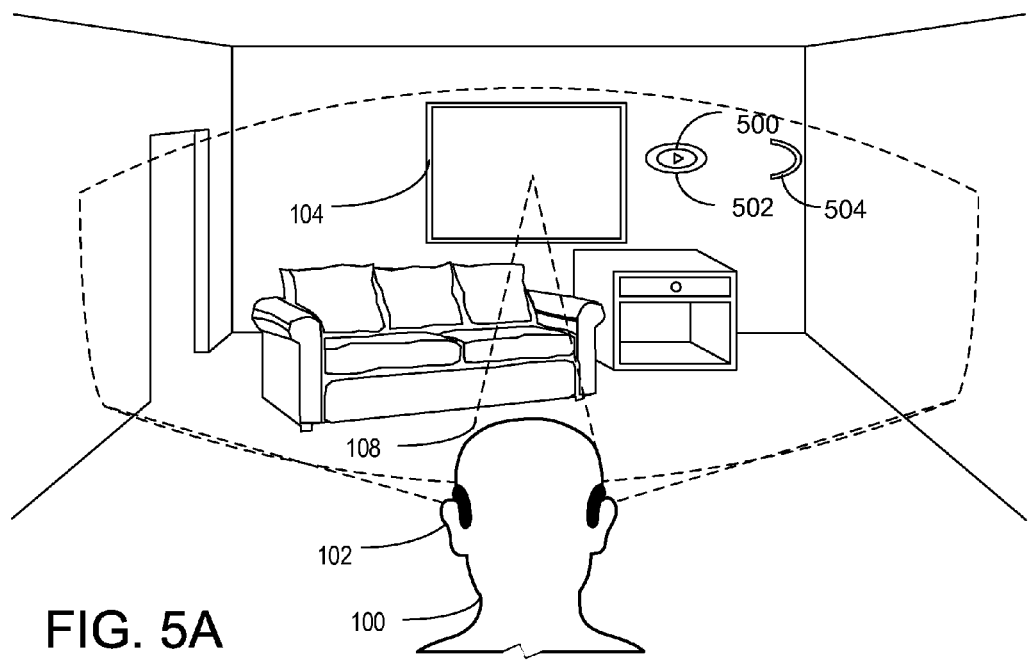
FIGS. 5A-5D show another example interaction of a user with a graphical user interface via a periodically updated position signal.
Figure 5B:
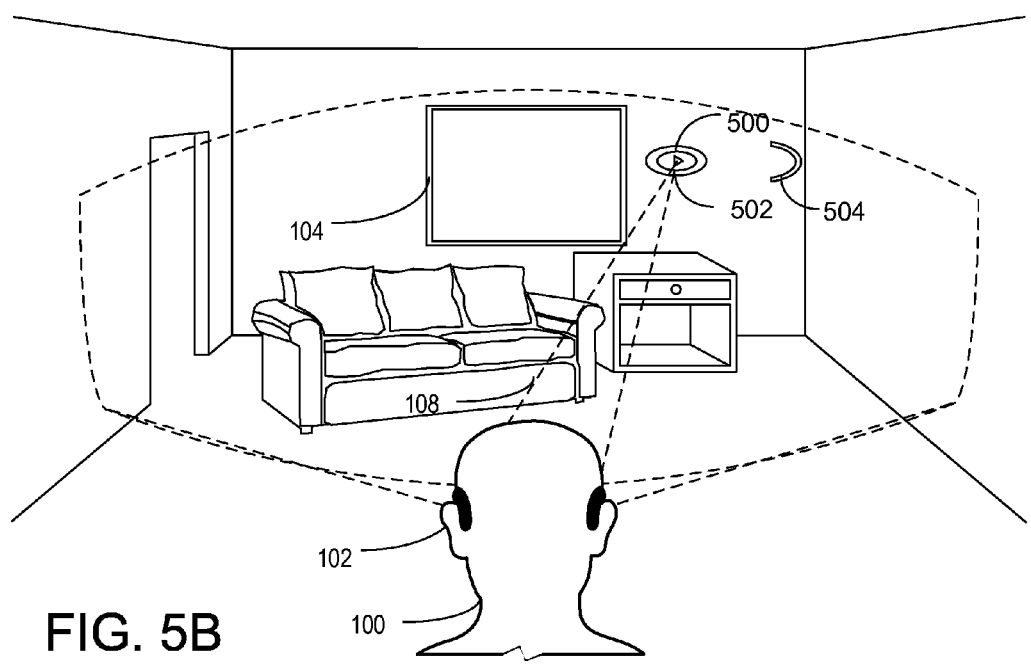
Figure 5C:
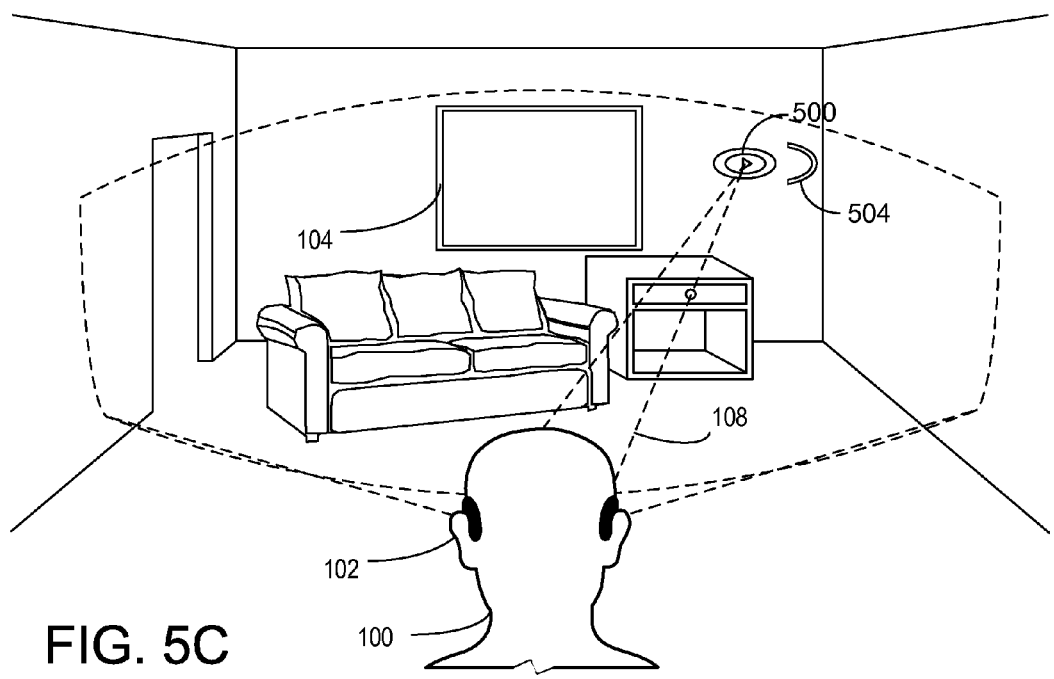
Figure 5D:
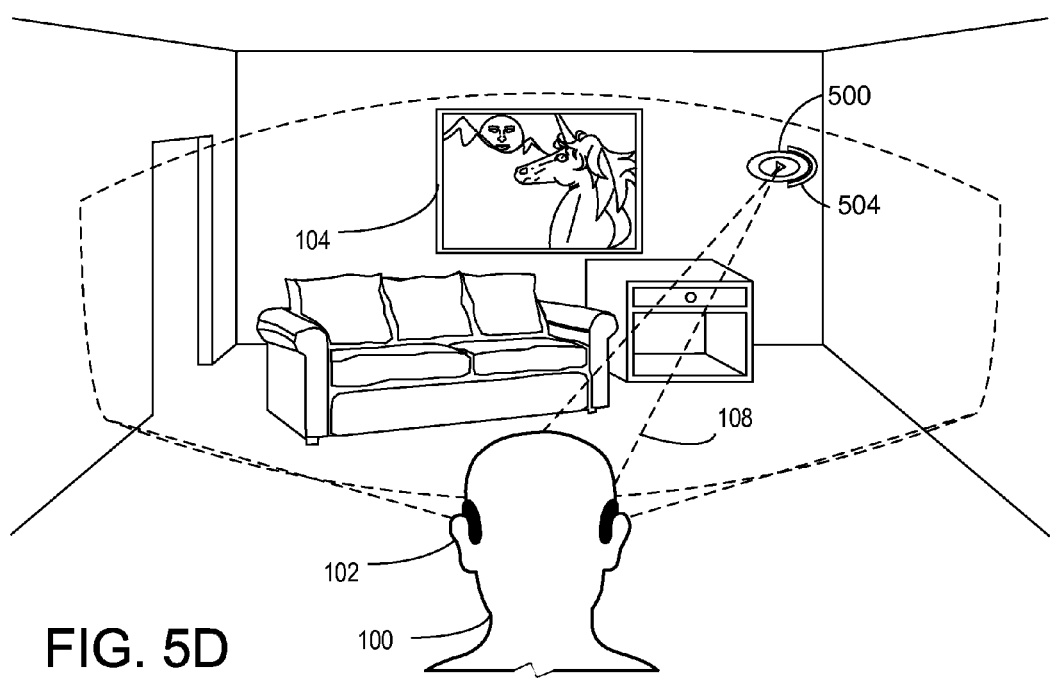

FIGS. 5A-5D show an embodiment of a pursuit motion interaction in which an eye gaze gesture is used to move a user interface element into a destination position relative to an associated interactive target. First, FIG. 5A shows the user 100 with gaze lines 108 directed at a virtual television object 104, and also shows an interactive target 500 and destination position 504 in the form of a receptacle 504 for the interactive target 500, wherein the receptacle 504 may remain in a fixed location during movement of the interactive target. In FIG. 5A, the interactive target 500 is shown at an initial position 502. If the user choses to select the user interface element, the user may first direct a location of gaze at the interactive target 500, as shown in FIG. 5B. Intersection of the gaze location with the interactive target (potentially for a threshold time duration) may start motion of the interactive target smoothly away from the location of gaze and toward the destination position 504. The user may follow the motion of the interactive target from the initial position to the destination position to select the user interface element, as indicated at 5C and 5D. It will be understood that the destination position indicator may be displayed persistently, or may be revealed upon gaze interaction with the corresponding user interface element.

As previously discussed, a user may choose to not activate a content item by disengaging from a gesture. In the case of a pursuit based gesture, the user may look away from the interactive target before it reaches the destination position to prevent activation of the content item, or may disengage in any other suitable manner (e.g. voice command, body gesture command, etc.). It should be noted that a gaze interaction with a user interface element, whether pursuit, sequential or other, may tolerate some amount of error in the location of gaze. For example, gaze locations within a threshold distance outside of the displayed area of the interactive target may still be considered to be a gaze interaction with the target in some embodiments, thereby allowing a user's gaze to stray to some degree without discontinuing a gesture being performed. This tolerance may have characteristics of hysteresis, in that the tolerance may be applied during performance of a gesture but not during initiation of an interaction with an interactive target.

Returning briefly again to FIG. 3, if the motion of the periodically updated position signal with respect to the interactive target meets a predetermined condition (or one or more predetermined conditions of a set of conditions), then method 300 comprises, at 314, determining that the user has selected the UI element. The term "selection" and the like may refer to any interaction with the UI element and/or program represented thereby. Examples of selecting include, but are not limited to, launching a program represented by the element, directing an operating system focus at a program or data represented by the element, showing information regarding a program or data represented by the element, changing a state of a program or data represented by the element (e.g. controlling video playback, adjusting audio volume level, selecting an item from a user interface menu, etc.), showing information regarding the user interface element itself (as opposed to information regarding the program or data represented by the element), and/or any other suitable interaction with the user interface element and/or program or data represented thereby. On the other hand, if the motion of the periodically updated position signal with respect to the interactive target does not meet the predetermined condition or conditions, then method 300 comprises, at 316, not determining that the user has selected the user interface element.

In some embodiments, multiple types of motion interactions may be usable with a same interactive target to select an associated user interface element. For example, while a novice user may prefer a slower pace of a pursuit gesture, a more advanced user may desire a faster sequential interaction, for example, using saccadic gestures. Therefore, in some embodiments, an interactive target may allow interaction via two or more different predetermined motion conditions that may be used to select the corresponding user interface element. This may allow users of varying skill and/or preferences to interact with the graphical user interface in different ways. For example, an interactive target that is rectangular in shape may be linked to pursuit gesture and a saccadic gesture. A pursuit gesture may activate the associated content item as the user gazes from one side of the target to the other (with or without following a motion of an interactive element), while a saccadic gesture may follow a gaze path between preselected locations on the target.

Thus, the embodiments disclosed herein may allow user interface elements to be selected via a periodically updated position signal without the use of additional input mechanisms (e.g. buttons, voice, etc.) to manifest an intent to select an element, and without the use of dwell gestures, though dwells may be used in combination with the disclosed eye gaze gestures in some examples.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
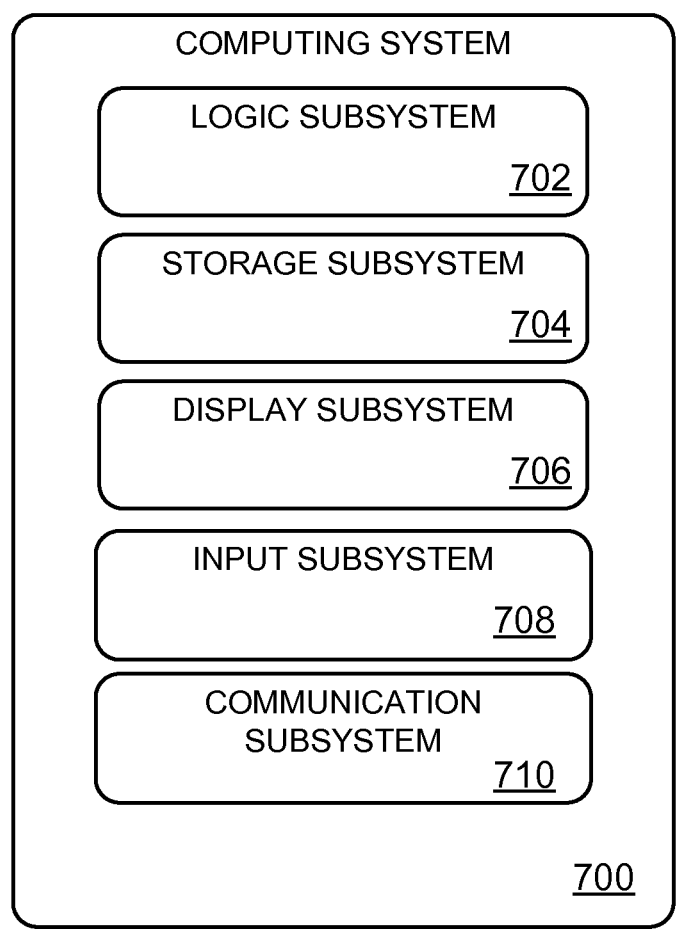
FIG. 7 shows an example embodiment of a computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), wearable devices (e.g. head mounted displays, such as those described above) and/or other computing devices.

Computing system 700 includes a logic subsystem 702 and a storage subsystem 704. Computing system 700 further include a display subsystem 706, input subsystem 708, communication subsystem 710, and/or other components not shown in FIG. 7.

Logic subsystem 702 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 704 includes one or more physical devices configured to hold instructions executable by the logic subsystem to implement the methods and processes described herein. When such methods and processes are implemented, the state of storage subsystem 704 may be transformed—e.g., to hold different data.

Storage subsystem 704 may include removable and/or built-in computer-readable storage media. Storage subsystem 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 704 may include volatile, nonvolatile, dynamic, static, read/write, read-only, random-access, sequential-access, location-addressable, file-addressable, and/or content-addressable devices.

It will be appreciated that storage subsystem 704 includes one or more physical devices and excludes signals per-se. However, aspects of the instructions described herein alternatively may be propagated by a communication medium (e.g., an electromagnetic signal, an optical signal, etc.), as opposed to being stored via physical storage device.

Aspects of logic subsystem 702 and storage subsystem 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic subsystem 702 executing instructions held by storage subsystem 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may represent individual or groups of executable files, data files, libraries, drivers, scripts, database records, etc. It further will be appreciated that embodiments may be implemented as software-as-a-service (SaaS) in which one or more programs and/or data are stored remotely from end users and accessed by end users via a network.

When included, display subsystem 706 may be used to present a visual representation of data held by storage subsystem 704. This visual representation may take the form of a graphical user interface (GUI). As the herein described methods and processes change the data held by the storage subsystem, and thus transform the state of the storage subsystem, the state of display subsystem 706 may likewise be transformed to visually represent changes in the underlying data. Display subsystem 706 may include one or more display devices utilizing virtually any type of technology. Such display devices may be combined with logic subsystem 702 and/or storage subsystem 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method of receiving a selection of a first selectable user interface element displayed on a graphical user interface via a user input mechanism providing a periodically updated position signal, the method comprising:
   displaying at a first location on the graphical user interface the first selectable user interface element and also displaying at least partially outside of and adjacent to the first selectable user interface element a first moveable interactive target associated with the first selectable user interface element, wherein the first selectable user interface element is selectable via gaze interaction with the first moveable interactive target;
displaying at a second location on the graphical user interface a second selectable user interface element and also displaying at least partially outside of and adjacent to the second selectable user interface element a second moveable interactive target associated with the second selectable user interface element, wherein the second selectable user interface element is selectable via gaze interaction with the second moveable interactive target;
receiving an input of coordinates of the periodically updated position signal from an eye tracking system; and
determining a selection of the first selectable user interface element in response to a motion interaction of the periodically updated position signal first interacting with the first selectable user interface element and then interacting with the first moveable interactive target via a pursuit eye gaze gesture involving motion of the first moveable interactive target toward a displayed destination position to meet a predetermined motion condition for selecting the first selectable user interface element.

2. The method of claim 1, wherein the pursuit eye gaze gesture includes an eye movement gesture moving the first moveable interactive target from an initial position to a destination position.

3. The method of claim 1, wherein the predetermined motion condition is one of two or more different motion conditions useable to select the first selectable user interface element.

4. The method of claim 1, wherein the first moveable interactive target is displayed persistently on the graphical user interface.

5. The method of claim 1, wherein one or more moveable interactive targets is displayed in response to a user's interaction with one or more selectable user interface elements.

6. The method of claim 1, wherein the displayed destination location comprises:
a receptacle displayed at a destination position of the first moveable interactive target, and wherein the pursuit eye gaze gesture moves the first moveable interactive target into the receptacle.

7. On a computing device, a method of receiving a selection of a first selectable user interface element via eye gaze gestures of content displayed on a graphical user interface, the method comprising:
displaying at a first location on the graphical user interface a representation of the first selectable user interface element and also displaying at least partially outside of and adjacent to the first selectable user interface element a first interactive target associated with the first selectable user interface element, wherein the first selectable user interface element is selectable via gaze interaction with the first interactive target;
displaying at a second location on the graphical user interface a representation of a second selectable user interface element and also displaying at least partially outside of and adjacent to the second selectable user interface element a second interactive target associated with the second selectable user interface element, wherein the second selectable user interface element is selectable via gaze interaction with the second interactive target;
displaying on the graphical user interface a representation of a different interactive target associated with the first selectable user interface element;
receiving from an eye tracking system an input of coordinates corresponding to an eye gaze gesture; and
determining a selection of the first selectable user interface element if the eye gaze gesture includes a motion interaction first with the first selectable user interface element, then moving from the first selectable user interface element to the first interactive target and then moving from the first interactive target to the different interactive target to confirm an intent to select the first selectable user interface element.

8. The method of claim 7, wherein determining selection of the first selectable user interface element comprises determining that the motion interaction meets a predetermined motion condition, wherein the predetermined motion condition includes a sequential saccadic gesture.

9. The method of claim 8, wherein the sequential saccadic gesture includes a specific sequence of motion interactions including a motion interaction with the first selectable user interface element and then the first interactive target followed by a motion interaction with the different interactive target.

10. The method of claim 7, wherein the first interactive target is displayed persistently on the graphical user interface.

11. The method of claim 7, wherein the first interactive target is displayed in response to the interaction with the first selectable user interface element.

12. The method of claim 7, wherein selection of the first selectable user interface element is determined if the eye gaze gesture includes a motion interaction with the first selectable user interface element, then with the first interactive target, and then with the different interactive target.

13. The method of claim 12, wherein the different interactive target is displayed responsive to the motion interaction with the first interactive target.

14. A head-mounted display system configured to receive a selection of displayed content via eye gaze gestures; the head-mounted display system comprising:
a near-eye display device;
an eye tracking input system;
a logic subsystem; and
a storage subsystem holding instructions executable by the logic subsystem to:
display at a first location via the near-eye display device a representation of a first selectable user interface element, the first selectable user interface element being selectable by interaction with a first interactive target;
display at a second location via the near-eye display device a representation of a second selectable user interface element, the second selectable user interface element being selectable by interaction with a second interactive target;
receive an input of coordinates from an eye gaze tracking system,
from the input of coordinates, detect an eye gaze gesture interaction with the first selectable user interface element,
in response to detecting the eye gaze gesture interaction with the first selectable user interface element, display via the near-eye display device a representation of the first interactive target at least partially outside of and adjacent to the first selectable user interface element, the first interactive target being associated with the first selectable user interface element, detect from the input of coordinates from the eye gaze tracking system a motion of the eye gaze from the first selectable user interface element to the first interactive target, in response to detecting the eye gaze gesture interaction with the first interactive target, display via the near-eye display device a representation of a different interactive target associated with the first selectable user interface element, and when an interaction with the different interactive target is detected from the input of coordinates, confirm an intent to select the first selectable user interface element, and when the interaction with the different interactive target is not detected from the input of coordinates, not select the first selectable user interface element.

\* \* \* \* \*